(12) United States Patent
Chauhan et al.

(10) Patent No.: US 12,346,182 B2
(45) Date of Patent: Jul. 1, 2025

(54) APPLICATION-BASED POWER CONTROL FOR A WIRELESS DEVICE

(71) Applicant: Intel Corporation, Santa Clara, CA (US)

(72) Inventors: Shailendra Singh Chauhan, Bengaluru (IN); Mythili Hegde, Bangalore (IN); Arunthathi Chandrabose, Bangalore (IN); Santhosh Ap, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 17/398,218

(22) Filed: Aug. 10, 2021

(65) Prior Publication Data

US 2022/0413579 A1 Dec. 29, 2022

(30) Foreign Application Priority Data

Jun. 23, 2021 (IN) .............................. 202141028119

(51) Int. Cl.
| | |
|---|---|
| *G06F 1/26* | (2006.01) |
| *H04W 28/20* | (2009.01) |
| *H04W 52/26* | (2009.01) |
| *H04W 84/04* | (2009.01) |
| *H04W 84/12* | (2009.01) |

(52) U.S. Cl.
CPC ............. *G06F 1/266* (2013.01); *H04W 28/20* (2013.01); *H04W 52/267* (2013.01); *H04W 84/04* (2013.01); *H04W 84/12* (2013.01)

(58) Field of Classification Search
CPC .......... G06F 1/266; G06F 1/26; H04W 28/20; H04W 52/267; H04W 84/04; H04W 84/12
See application file for complete search history.

(56) References Cited

U.S. PATENT DOCUMENTS

| | | | |
|---|---|---|---|
| 6,624,918 B1 * | 9/2003 | French | H04J 14/0221 330/110 |
| 7,707,297 B2 * | 4/2010 | Haddad | H04L 47/11 709/227 |

(Continued)

OTHER PUBLICATIONS

"Circuitry." Merriam-Webster.com Dictionary, Merriam-Webster (originally available Apr. 25, 2009 based on archive.org records), https://www.merriam-webster.com/dictionary/circuitry. Accessed Jan. 6, 2025. (Year: 2009).*

*Primary Examiner* — Faisal M Zaman
(74) *Attorney, Agent, or Firm* — Schwegman Lundberg & Woessner, P.A.

(57) ABSTRACT

A wireless device includes a voltage regulator circuit configured to generate a voltage signal of a first input voltage, and a wireless baseband processing circuitry (WBPC) coupled to the voltage regulator circuit to receive the voltage signal. The WBPC is configured to process signals for transmission or reception using wireless technology. The WBPC includes a sub-system processor circuit configured to detect a wireless bandwidth of an application executing on an application processor of the wireless device; determine a second input voltage based on the wireless bandwidth of the application and a maximum voltage supported by the WBPC; and encode a feedback signal for communication to the voltage regulator circuit. The feedback signal causes adjustment of the voltage signal to the second input voltage.

16 Claims, 7 Drawing Sheets

(56) References Cited

U.S. PATENT DOCUMENTS

| | | | |
|---|---|---|---|
| 2012/0151065 A1* | 6/2012 | Rintaluoma | H04N 19/179 |
| | | | 709/226 |
| 2013/0249505 A1* | 9/2013 | Brown | H02M 3/156 |
| | | | 323/223 |
| 2014/0051372 A1* | 2/2014 | Shoshan | H04W 88/06 |
| | | | 455/90.2 |
| 2014/0149762 A1* | 5/2014 | Allen-Ware | G06F 1/3296 |
| | | | 713/320 |
| 2014/0301262 A1* | 10/2014 | Homchaudhuri | |
| | | | H04W 52/0216 |
| | | | 370/311 |
| 2015/0043554 A1* | 2/2015 | Meylan | H04W 88/06 |
| | | | 370/338 |
| 2016/0105846 A1* | 4/2016 | Anderson | H04W 48/20 |
| | | | 370/338 |
| 2022/0200271 A1* | 6/2022 | Lee | H02H 9/02 |
| 2022/0240199 A1* | 7/2022 | Le | H04W 52/28 |
| 2022/0329147 A1* | 10/2022 | Wen | H02M 1/0009 |

* cited by examiner

APPLICATION-BASED POWER CONTROL FOR A WIRELESS DEVICE

This application claims the benefit of priority to Indian Patent Application No. 202141028119, filed Jun. 23, 2021, which is incorporated herein by reference in its entirety.

TECHNICAL FIELD

Various embodiments generally may relate to the field of radio frequency (RF) signal communication and transmission by a wireless device, including application-based power control for the wireless device.

BACKGROUND

With the increased popularity of fifth-generation (5G) communications, and subsequent sixth-generation (6G) communications, there is a growing demand for power and bandwidth versatility of wireless wide area network (WWAN) enabled wireless devices. However, current implementations of power supply circuits tack the flexibility to support power supply features that are optimal for millimeter-wave (mmW) and sub-6 GHz 5G communications.

BRIEF DESCRIPTION OF THE DRAWINGS

In the drawings, like numerals may describe the same or similar components or features in different views. Like numerals having different letter suffixes may represent different instances of similar components. Some embodiments are illustrated by way of example, and not limitation, in the figures of the accompanying drawings in which.

DETAILED DESCRIPTION

Figure 1:
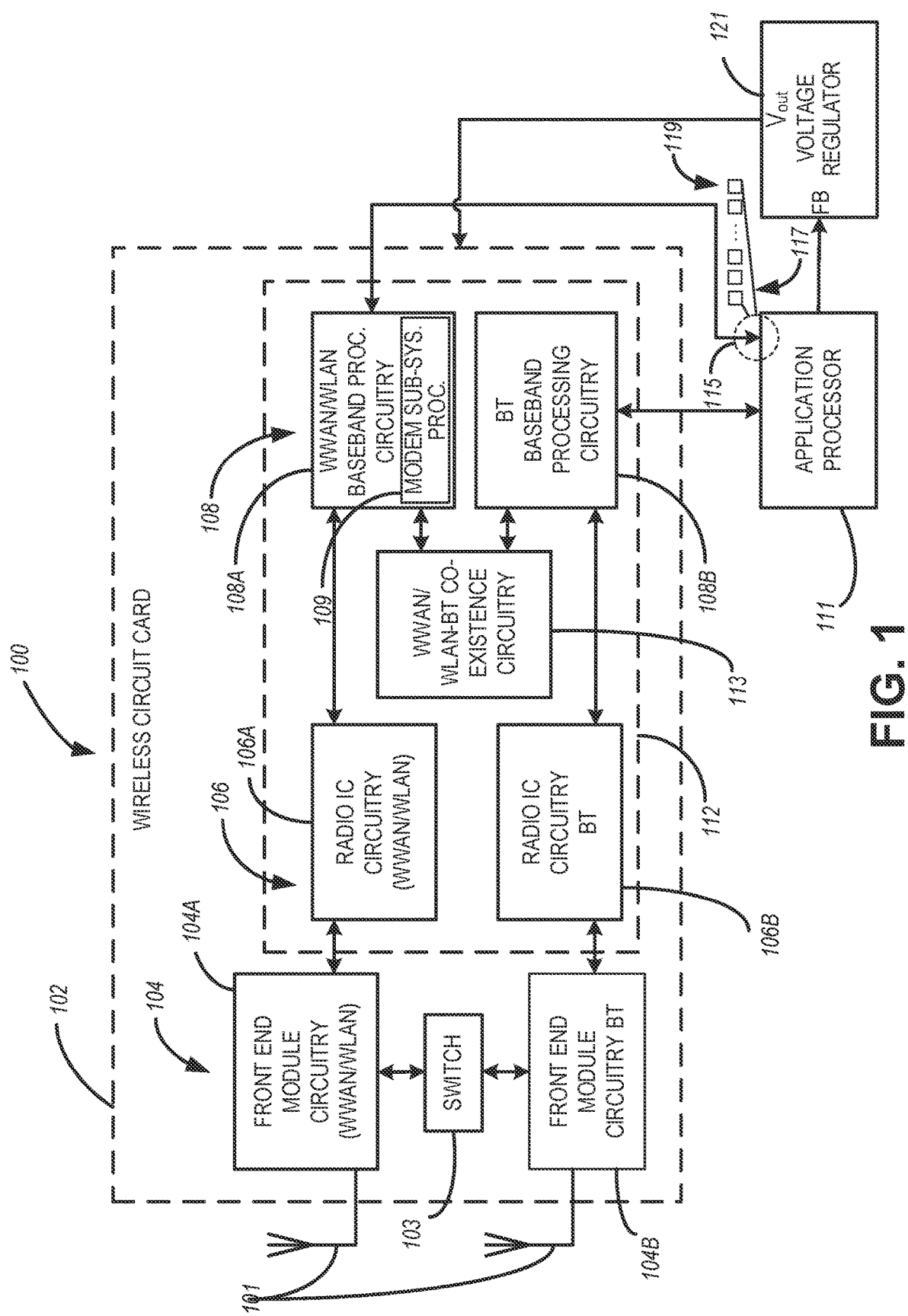
FIG. 1 is a block diagram of a radio architecture, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Techniques disclosed herein can be used for application-based power control for wireless devices, including application-based power control for 5G modems in wireless devices. In some aspects and based on the M.2 specification for internally mounted computer expansion cards and associated connectors, the input voltage to a WWAN card is 3.3 Volts (V) and the maximum supported current is 2.5 Amps (A) (e.g., 0.5 A per pin at maximum connector capability), which translates to a maximum power of 3.3 V×2.5 A=8.25 Watts (W). The maximum power can be supplied to the Power Management Integrated Circuit (PMIC), and the PMIC can generate the local supply to all the components inside the WWAN card (e.g., baseband chip/modem, RF transceiver, and other RF components). In some aspects, a workload (e.g., an application executing on an application processor or CPU) for high throughput may need power as high as 10 W for sub-6 GHz communications. In aspects when the wireless device includes a millimeter (mm) wave (mmW) transceiver, the power requirement may increase further by several watts to enable maximum upload and download speed the WWAN card can support.

For example, in a sub-6 GHz use case, a user may be located in an airport and may be trying to download and attending a team meeting and also uploading a file to a remote server. In this configuration, the wireless device modem can be configured to operate using 5G, LTE, and mmW communications with a maximum throughput of 4 gigabits per second (Gbps) and uplink (UL) throughput of 200 megabits per second (Mbps), resulting in a power consumption increasing to 8.75 W at an ambient temperature of 45° C.

In aspects when the wireless device is a 1S system (e.g., using a single power cell), the PMIC may support a maximum of 5 V input voltage. The disclosed techniques may be used (in connection with 1S, 2S, 3S, 4S, 5S, or other devices) to increase the voltage to the WWAN PMIC from the device voltage regulator so that the WWAN PMIC, in turn, can supply additional current to the baseband/RF chip and other circuits inside the wireless card for the high-bandwidth operation. More specifically, a wireless device may include a voltage regulator circuit configured to generate a voltage signal of a first input voltage (e.g., 3.3 V), and a wireless baseband processing circuitry (WBPC) coupled to the voltage regulator circuit to receive the voltage signal. The WBPC may be configured to process signals for transmission or reception using wireless technology (e.g., based on a WWAN protocol standard). The WBPC may include a sub-system processor circuit (also referred to as a sub-system processor) configured to detect a wireless bandwidth of an application executing on an application processor of the wireless device. Optionally, the sub-system processor circuit may retrieve a voltage indicator of a maximum voltage supported by the WBPC. In some embodiments, the maximum voltage supported by the WBPC is known a priori (e.g., at the time the wireless device is powered on). The sub-system processor circuit determines a second input voltage (e.g., 5 V) based on the wireless bandwidth of the application and the maximum voltage supported by the WBPC. The sub-system processor encodes a feedback signal for communication to the voltage regulator circuit. Based on the feedback signal, the voltage regulator is configured to adjust the voltage signal to the second input voltage In this regard, a wireless device may use a dedicated voltage regulator for the WWAN WBPC module. As a default power setting, the voltage regulator may power on with 3.3 V and the WBPC module may initialize. The application processor (e.g., a host processor or a host CPU), as well as a sub-system processor of the WBPC, may be configured to detect a wireless bandwidth of an application executing on the application processor as well as the maximum voltage (e.g., 5 V) supported by the WBPC. Once the application processor (or the sub-system processor) detect (or are notified) that the WBPC module supports 5 V capability, the voltage regulator is configured to supply the maximum voltage (e.g., 5 V) to the WWAN WBPC module. Once the 5 V supply voltage is enabled, the maximum power delivered to the WBPC module will be 5 V×2.5 A=12.5 W. The additional power will enable the new (higher bandwidth requirement) performance from the same module, which capability was earlier limited due to the maximum supplied power of 8.25 W due to the standard supply voltage of 3.3 V.

FIG. 1 is a block diagram of a radio architecture 100 in accordance with some embodiments. The radio architecture 100 may be implemented in a computing device including user equipment (UE), a base station (e.g., a next generation Node-B (gNB), enhanced Node-B (eNB)), a smartphone, or another type of wired or wireless device using synthesizer circuitry with frequency estimation. The radio architecture 100 may include radio front-end module (FEM) circuitry 104, radio IC circuitry 106, and baseband processing circuitry 108. Radio architecture 100 as shown includes both Wireless Local Area Network (WLAN) or Wireless Wide Area Network (WWAN) functionality and Bluetooth (BT) functionality although embodiments are not so limited. In this disclosure, "WLAN" and "Wi-Fi" are used interchangeably. As used herein, the term "WWAN/WLAN" indicates circuitry which can perform either WWAN or WLAN functionalities.

FEM circuitry 104 may include a WLAN or WWAN (indicated as WWAN/WLAN) FEM circuitry 104A and a Bluetooth (BT) FEM circuitry 104B. The WWAN/WLAN FEM circuitry 104A may include a receive signal path comprising circuitry configured to operate on WWAN/WLAN RF signals received from one or more antennas 101, to amplify the received signals, and to provide the amplified versions of the received signals to the WWAN/WLAN radio IC circuitry 106A for further processing. The BT FEM circuitry 104B may include a receive signal path which may include circuitry configured to operate on BT RF signals received from the one or more antennas 101, to amplify the received signals and to provide the amplified versions of the received signals to the BT radio IC circuitry 106B for further processing. The FEM circuitry 104A may also include a transmit signal path which may include circuitry configured to amplify WLAN signals provided by the radio IC circuitry 106A for wireless transmission by the one or more antennas 101. Besides, the FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited and include within their scope the use of a FEM (not shown) that includes a transmit path and/or a receive path for both WWAN/WLAN and BT signals, or the use of one or more FEM circuitries where at least some of the FEM circuitries share transmit and/or receive signal paths for both WWAN/WLAN and BT signals.

Radio IC circuitry 106 as shown may include WWAN/WLAN radio IC circuitry 106A and BT radio IC circuitry 106B. The WWAN/WLAN radio IC circuitry 106A may include a receive signal path which may include circuitry to down-convert WWAN/WLAN RF signals received from the FEM circuitry 104A and provide baseband signals to WWAN/WLAN baseband processing circuitry 108A. The BT radio IC circuitry 106B may, in turn, include a receive signal path which may include circuitry to down-convert BT RF signals received from the FEM circuitry 104B and provide baseband signals to BT baseband processing circuitry 108B. The WWAN/WLAN radio IC circuitry 106A may also include a transmit signal path which may include circuitry to up-convert WWAN/WLAN baseband signals provided by the WWAN/WLAN baseband processing circuitry 108A and provide WWAN/WLAN RF output signals to the FEM circuitry 104A for subsequent wireless transmission by the one or more antennas 101. The BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WWAN/WLAN baseband processing circuitry 108A and a BT baseband processing circuitry 108B. The WWAN/WLAN baseband processing circuitry 108A may include a memory, such as, for example, a set of RAM arrays in a Fast Fourier Transform (FFT) or Inverse Fast Fourier Transform (IFFT) block (not shown) of the WLAN baseband processing circuitry 108A. Each of the WWAN/WLAN baseband processing circuitry 108A and the BT baseband processing circuitry 108B may further include one or more processors and control logic to process the signals received from the corresponding WWAN/WLAN or BT receive signal path of the radio IC circuitry 106, and to also generate corresponding WWAN/WLAN or BT baseband signals for the transmit signal path of the radio IC circuitry 106. Each of the baseband processing circuitries 108A and 108B may further include physical layer (PHY) and medium access control layer (MAC) circuitry and may further interface with the application processor 111 for generation and processing of the baseband signals and for controlling operations of the radio IC circuitry 106.

Referring still to FIG. 1, according to the shown embodiment, WWAN/WLAN-BT coexistence circuitry 113 may include logic providing an interface between the WWAN/WLAN baseband processing circuitry 108A and the BT baseband processing circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the one or more antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and the baseband processing circuitry 108 may be provided on a single radio card, such as wireless radio card 102. In some other embodiments, one or more antennas 101, the FEM circuitry 104, and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers. In some embodiments, the wireless radio card 102 may include a platform controller hub (PCH) system-on-a-chip (SOC) and a central processing unit (CPU)/host SOC.

In some of these multicarrier embodiments, radio architecture 100 may be part of a Wi-Fi communication station (STA) such as a wireless access point (AP), a base station, or a mobile device including a Wi-Fi enabled device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, IEEE 802.11-2016, and/or 802.11ax standards and/or proposed specifications for WLANs, although the scope of embodiments is not limited in this respect. Radio architecture 100 may also be suitable to transmit and/or receive communications in accordance with other techniques and standards, including a $3^{rd}$ Generation Partnership Project (3GPP) standard, including a communication standard used in connection with 5G or new radio (NR) communications.

In some embodiments, the radio architecture 100 may be configured for high-efficiency (HE) Wi-Fi communications in accordance with the IEEE 802.11ax standard or another standard associated with wireless communications. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband processing circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection-oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as the single wireless radio card 102, although embodiments are not so limited, and include within their scope discrete WWAN, WLAN, and BT radio cards. In this regard, a wireless device may include separate wireless circuit cards (e.g., with FEM circuitry, radio IC circuitry, and baseband processing circuitry) for each of WWAN, WLAN, and BT communications.

In some embodiments, the radio architecture 100 may include other radio cards, such as a cellular radio card configured for cellular (e.g., 3GPP such as LTE, LTE-Advanced, or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

In some embodiments, the baseband processing circuitry (also referred to as wireless baseband processing circuitry or WBPC) 108A within the wireless circuit card 102 includes a modem sub-system processor 109. The modem sub-system processor 109, as well as the application processor 111, are configured to perform application-based power control functions discussed herein (e.g., as discussed in connection with FIG. 3).

Figure 2:
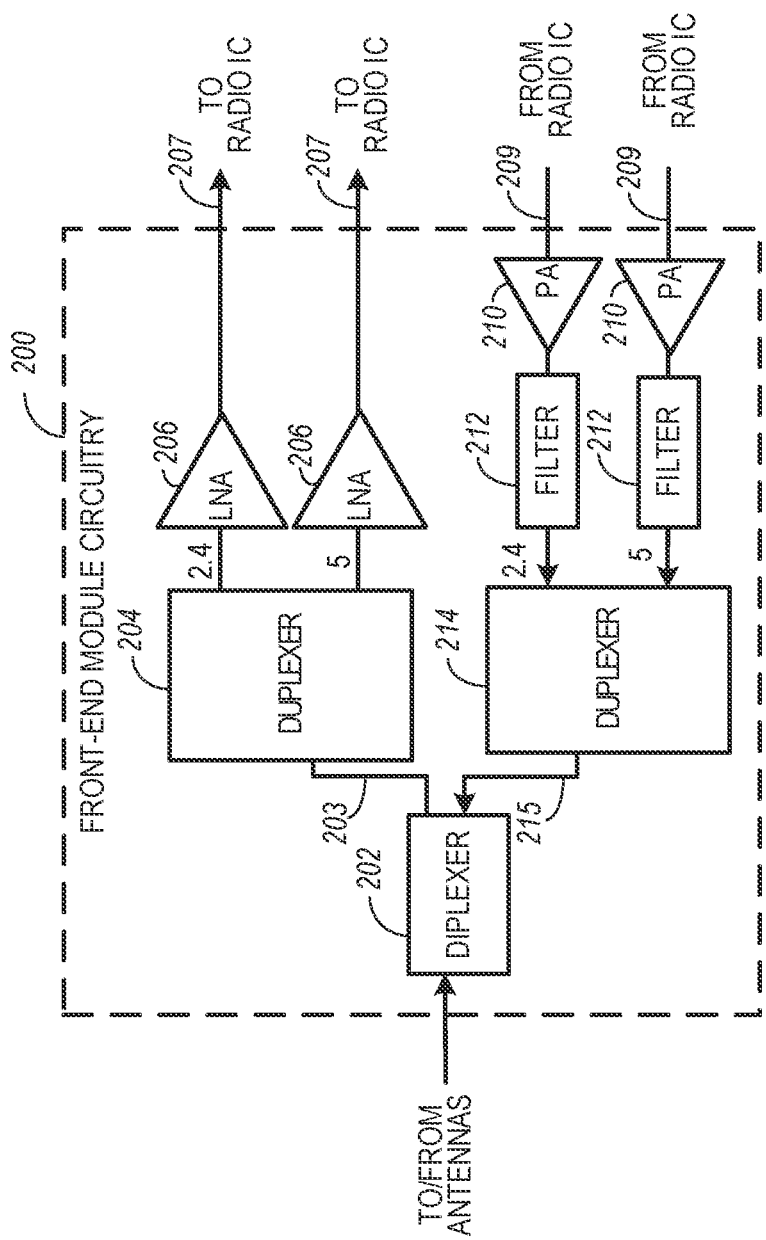
FIG. 2 illustrates a front-end module circuitry for use in the radio architecture of FIG. 1, in accordance with some embodiments.

FIG. 2 illustrates FEM circuitry 200 in accordance with some embodiments. The FEM circuitry 200 is one example of circuitry that may be suitable for use as the WWAN/WLAN and/or BT FEM circuitry 104A/104B (FIG. 1), although other circuitry configurations may also be suitable.

In some embodiments, the FEM circuitry 200 may include a diplexer 202 for use during transmit (TX) mode and receive (RX) mode operations. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the FEM circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by the one or more antennas 101 (FIG. 1)).

In some dual-mode embodiments for Wi-Fi communication, the FEM circuitry 200 may be configured to operate in, e.g., either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and one or more filters 212, such as a BPF, an LPF, or another type of filter for each frequency spectrum, and a transmit signal path duplexer 214 to provide the signals of one of the different spectrums onto a single transmit path for subsequent transmission by the one or more antennas 101 (FIG. 1). In some embodiments, BT communications may utilize the 2.4 GHz signal paths and may utilize the same FEM circuitry 200 as the one used for WLAN communications.

Figure 3:
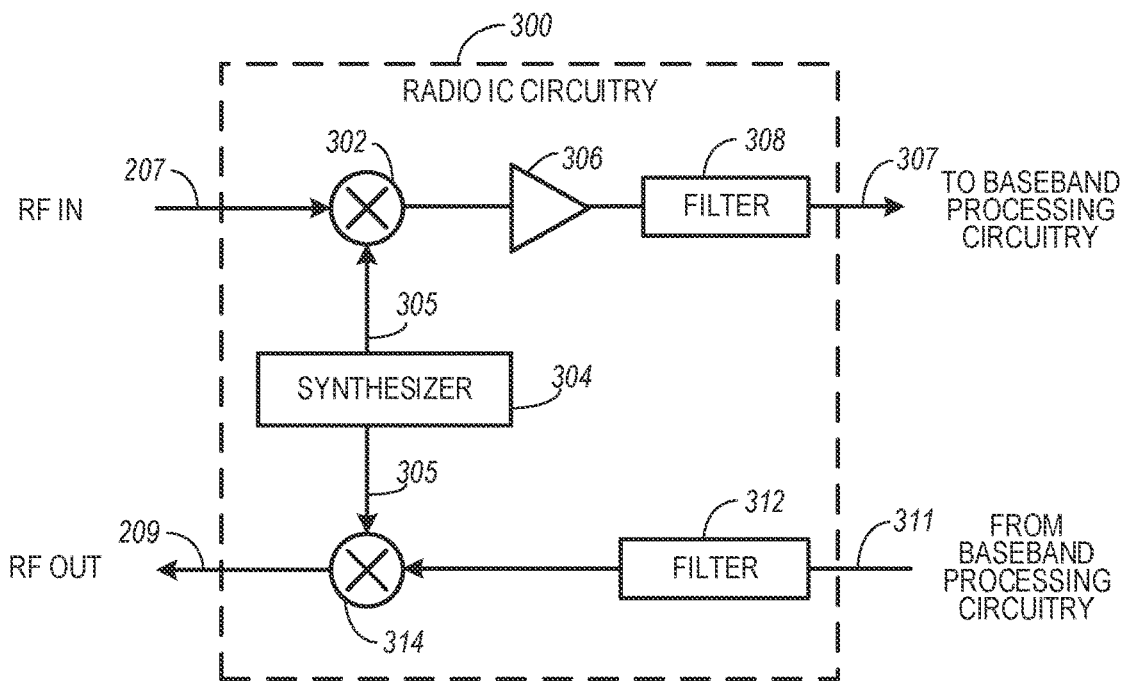
FIG. 3 illustrates circuitry for use in the radio architecture of FIG. 1, in accordance with some embodiments.

FIG. 3 illustrates radio IC circuitry 300 in accordance with some embodiments. The radio IC circuitry 300 is one example of circuitry that may be suitable for use as the WWAN/WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include mixer circuitry 302, such as, for example, down-conversion mixer circuitry, amplifier circuitry 306, and filter circuitry 308. The transmit signal path of the radio IC circuitry 300 may include at least filter circuitry 312 and mixer circuitry 314, such as up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry and may include, although not shown, embodiments where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by the synthesizer circuitry 304. The amplifier circuitry 306 may be configured to amplify the down-converted signals and the filter circuitry 308 may include an LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include an LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of the synthesizer circuitry 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature-phase (Q) paths). In such an embodiment, RF input signal 207 from FIG. 2 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer circuitry 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in the duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature-phase (Q) path) may operate at a 25% duty cycle, which may result in a significant reduction in power consumption.

The RF input signal 207 (FIG. 2) may comprise a balanced signal, although the scope of the embodiments is not limited in this respect. The I and Q baseband output signals may be provided to the low-noise amplifier, such as amplifier circuitry 306 (FIG. 3) or to filter circuitry 308 (FIG. 3).

In some embodiments, the output baseband signals 307 and the input baseband signals 311 may be analog, although the scope of the embodiments is not limited in this respect. In some alternate embodiments, the output baseband signals 307 and the input baseband signals 311 may be digital. In these alternate embodiments, the radio IC circuitry may include an analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. In some embodiments, the synthesizer circuitry 304 may be a delta-sigma synthesizer, a frequency multiplier, or a synthesizer comprising a phase-locked loop with a frequency divider. According to some embodiments, the synthesizer circuitry 304 may include a digital frequency synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage-controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
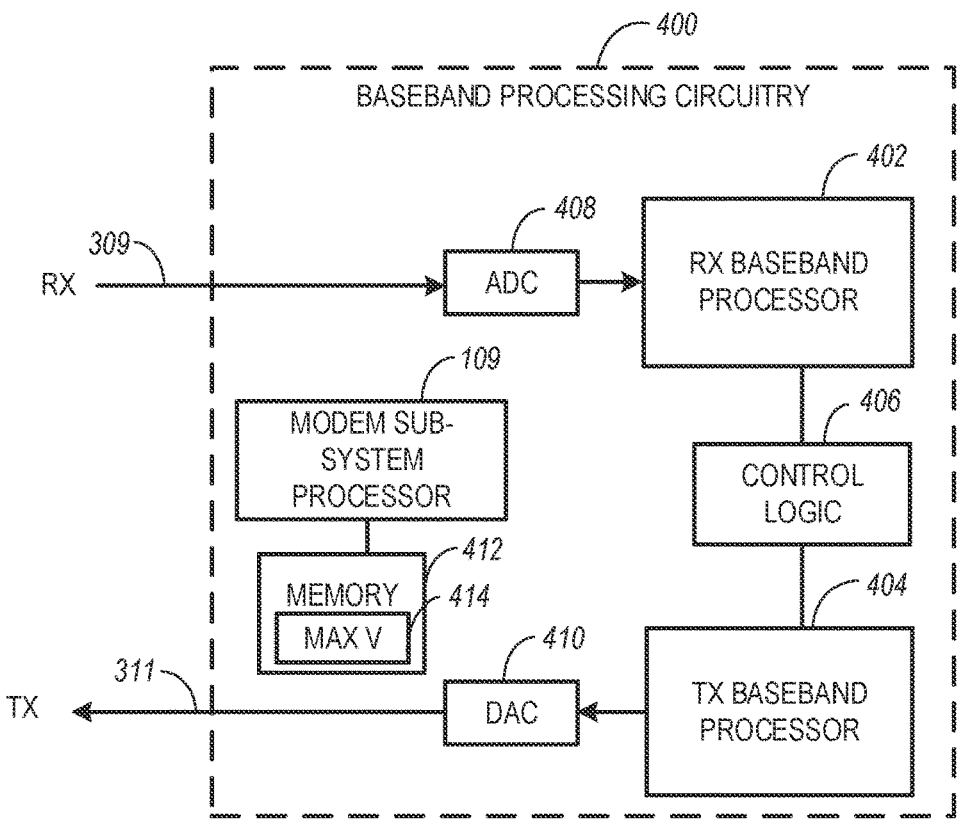
FIG. 4 illustrates a baseband processing circuitry with a modem sub-system processor for use in the radio architecture of FIG. 1, in accordance with some embodiments.

FIG. 4 illustrates a functional block diagram of baseband processing circuitry 400 in accordance with some embodiments. The baseband processing circuitry 400 is one example of circuitry that may be suitable for use as the wireless baseband processing circuitry (WBPC) 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 408 to convert analog baseband signals 309 received from the radio IC circuitry 106 to digital baseband signals for processing by the RX BBP 402. In these embodiments, the baseband processing circuitry 400 may also include DAC 410 to convert digital baseband signals from the TX BBP 404 to analog baseband signals 311.

In some embodiments that communicate OFDM signals or OFDMA signals, such as through the baseband processing circuitry 108A, the TX BBP 404 may be configured to generate OFDM or OFDMA signals as appropriate for transmission by performing an inverse fast Fourier transform (IFFT). The RX BBP 402 may be configured to process received OFDM signals or OFDMA signals by performing an FFT. In some embodiments, the RX BBP 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the one or more antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. The one or more antennas 101 may each include a set of phased-array antennas, although embodiments are not so limited.

Although the radio architecture 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

In some embodiments, the WBPC 100 (which may be the same as the WBPC 108A) includes a modem sub-system processor 109 coupled to memory 412. The memory 412 may be on-chip memory (e.g., within the WBPC 400) or off-chip memory (e.g., part of another circuit of the wireless circuit card 102) and is configured to store a voltage indicator 414 of a maximum voltage supported by the WBPC 400. In some aspects, the voltage indicator 414 is discoverable (e.g., accessible) by other circuits, such as the application processor 111. For example, the application processor 111 may directly access memory 412 via the interface 115. In other aspects, the interface 115 may include a plurality of pins 117, and a single pin (e.g., pin 119) of the plurality of pins 117 may be configured to indicate the voltage indicator 414. For example, a signal of 0 on pin 119 indicates a first input voltage (e.g., 3.3 V) as the maximum supported voltage by the WBPC 400, and a signal of 1 on pin 119 indicates a second input voltage (e.g., 5 V) as the maximum supported voltage by the WBPC 400. Example use of the maximum voltage supported by the WBPC 400 for application-based power control is discussed further herein below.

For example, the following functionalities may be performed by the modem sub-system processor (also referred to as sub-system processor or sub-system processor circuit) 109 when a wireless device (e.g., a wireless device including the wireless circuit card 102) performs functions based on a WWAN protocol standard. In this case, the WBPC 400 is also referred to as WWAN WBPC. In some embodiments, the wireless device includes a voltage regulator (also referred to as voltage regulator circuit) 121 configured to generate a voltage signal of a first input voltage. The wireless device further includes the WWAN WBPC 400 (which is the same as WBPC 108A) coupled to the voltage regulator circuit 121 to receive the voltage signal. The WWAN WBPC 400 includes the sub-system processor circuit 109 which is configured to detect a wireless bandwidth of an application executing on the application processor 111 of the wireless device. For example, the wireless bandwidth may be stored in on-chip memory by the application processor 111, which may be accessed by the sub-system processor circuit 109. In other aspects, the sub-system processor circuit 109 retrieves the wireless bandwidth via a communication link with the application processor 111.

Optionally, the sub-system processor circuit 109 is further configured to retrieve a voltage indicator (e.g., voltage indicator 414) of a maximum voltage supported by the WBPC (e.g., from on-chip memory 412). In other aspects, the retrieving or detecting of the voltage indicator may not be needed as the maximum voltage supported by the WBPC may be known a priori (e.g., at the time the wireless device is powered on).

The sub-system processor circuit 109 is further configured to determine a second input voltage based on the wireless bandwidth of the application and the maximum voltage supported by the WBPC. For example, the sub-system processor circuit 109 determines that the wireless bandwidth of the application is achieved at a certain voltage, which may be smaller than or equal to the maximum voltage supported by the WWAN WBPC. The determined certain voltage is then the second input voltage. The sub-system processor circuit 109 is further configured to encode a feedback signal for communication to the voltage regulator circuit 121. Based on the feedback signal, the voltage regulator is configured to adjust the voltage signal to the second input voltage. In some aspects, the feedback signal is communicated to the application processor 111 which sets the second input voltage via a feedback connection to the voltage regulator 121.

In some embodiments, the sub-system processor circuit 109 is configured to decode notification signaling from the application processor, the notification signaling including the wireless bandwidth of the application. In some aspects, the sub-system processor circuit 109 is configured to determine based on the notification signaling, a wireless bandwidth corresponding to the maximum voltage is equal to or higher than the wireless bandwidth of the application. In additional aspects, the sub-system processor circuit 109 is further configured to encode the feedback signal for communication to the voltage regulator circuit. Based on the feedback signal, the voltage regulator is configured to adjust the voltage signal to the second input voltage. The feedback signal may be based on determining the wireless bandwidth corresponding to the maximum voltage that is equal to or higher than the wireless bandwidth.

In some embodiments, the sub-system processor circuit 109 is configured to retrieve the voltage indicator of the maximum voltage from on-chip memory 412 of the WWAN WBPC 400. In some embodiments, the first input voltage is approximately about 3.3 V and the second input voltage is approximately about 5 V In some embodiments, the maximum voltage is known a priori (e.g., at the time the wireless device is powered on) and there may be no need to retrieve the voltage indicator.

In some embodiments, the sub-system processor circuit 109 is configured to encode a notification signal of the second input voltage for transmission to a WWAN base station. The notification signal causes adjustment of communication bandwidth between the WWAN base station and the wireless device based on the second input voltage. In some embodiments, the second input voltage is smaller than or equal to the maximum input voltage. Additionally, supplying the second input voltage to the WBPC causes adjustment of a communication bandwidth of the wireless device to satisfy the wireless bandwidth of the application.

In some embodiments, the following functionalities may be performed by the application processor 111 when a wireless device (e.g., a wireless device including the wireless circuit card 102) performs functions based on a WLAN protocol standard. In this case, the WBPC 400 is also referred to as WLAN WBPC. In some embodiments, the wireless device includes a voltage regulator (also referred to as voltage regulator circuit) 121 configured to generate a voltage signal of a first input voltage. The wireless device further includes the WLAN WBPC 400 (which is the same as WBPC 108A) coupled to the voltage regulator circuit 121 to receive the voltage signal. The WLAN WBPC 400 includes the application processor 111 which is configured to detect a wireless bandwidth of an application (executing on the application processor 111). For example, the wireless bandwidth may be stored in on-chip memory 412 by the application processor 111, which may be accessed by the sub-system processor circuit 109. In other aspects, the application processor detects the voltage indicator 414 via the status of one of the pins of interface 115 (as discussed hereinabove). In some embodiments, the maximum voltage is known a priori (e.g., at the time the wireless device is powered on) and there may be no need to retrieve the voltage indicator.

In this regard, the application processor 111 is further configured to (optionally) detect a voltage indicator (e.g., voltage indicator 414) of a maximum voltage supported by the WBPC (e.g., from on-chip memory 412). The application processor 111 is further configured to determine a second input voltage based on the wireless bandwidth of the application and the maximum voltage supported by the WBPC. For example, the application processor 111 determines that the wireless bandwidth of the application is achieved at a certain voltage, which may be smaller than or equal to the maximum voltage supported by the WWAN WBPC. The determined certain voltage is then the second input voltage. The application processor 111 is further configured to encode a feedback signal for communication to the voltage regulator circuit 121. The voltage regulator circuit 121 is configured to adjust the voltage signal to the second input voltage, based on the feedback signal.

Figure 5:
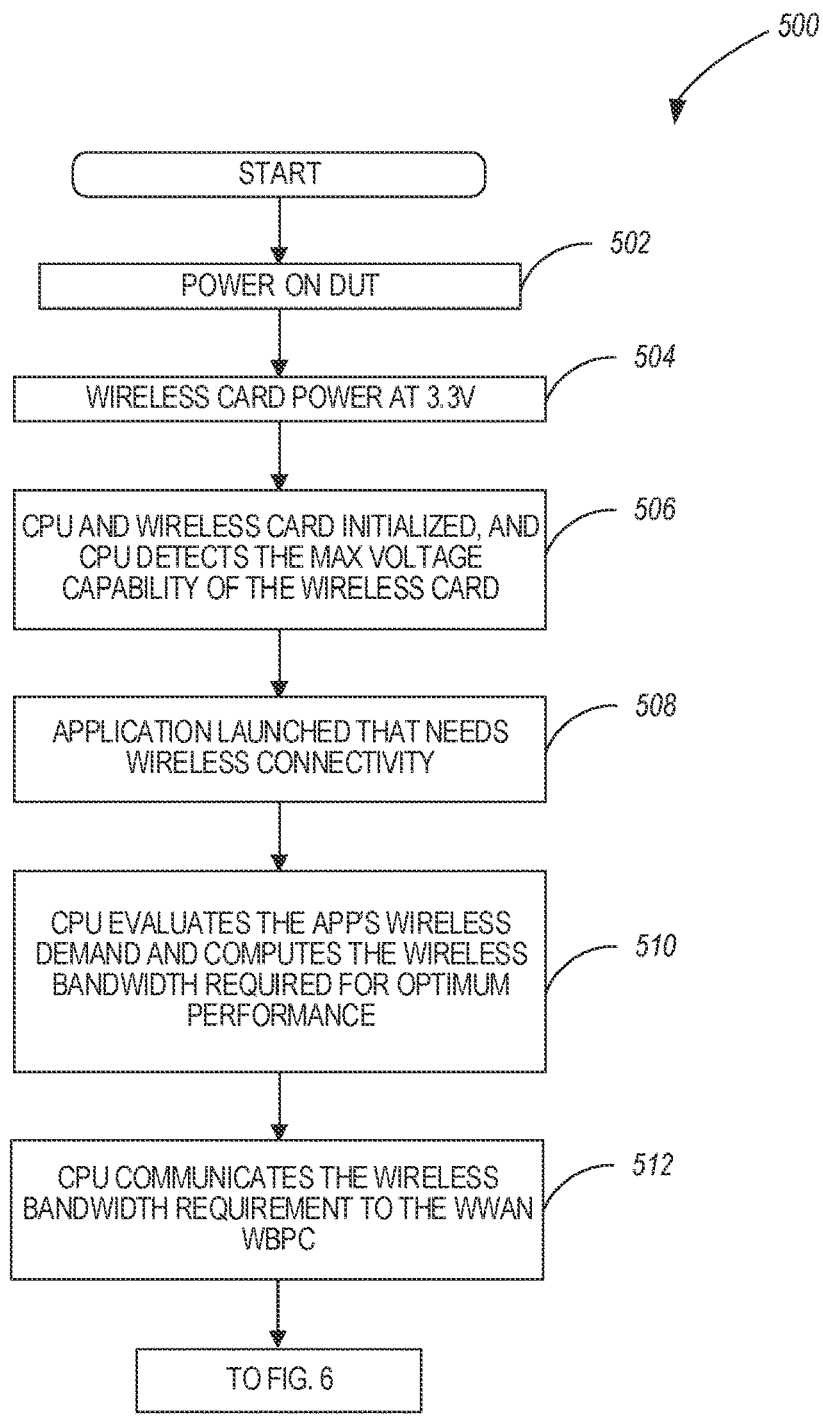
FIG. 5 and FIG. 6 illustrate a flow diagram of a method for controlling power to a wireless device, in accordance with some embodiments.
Figure 6:
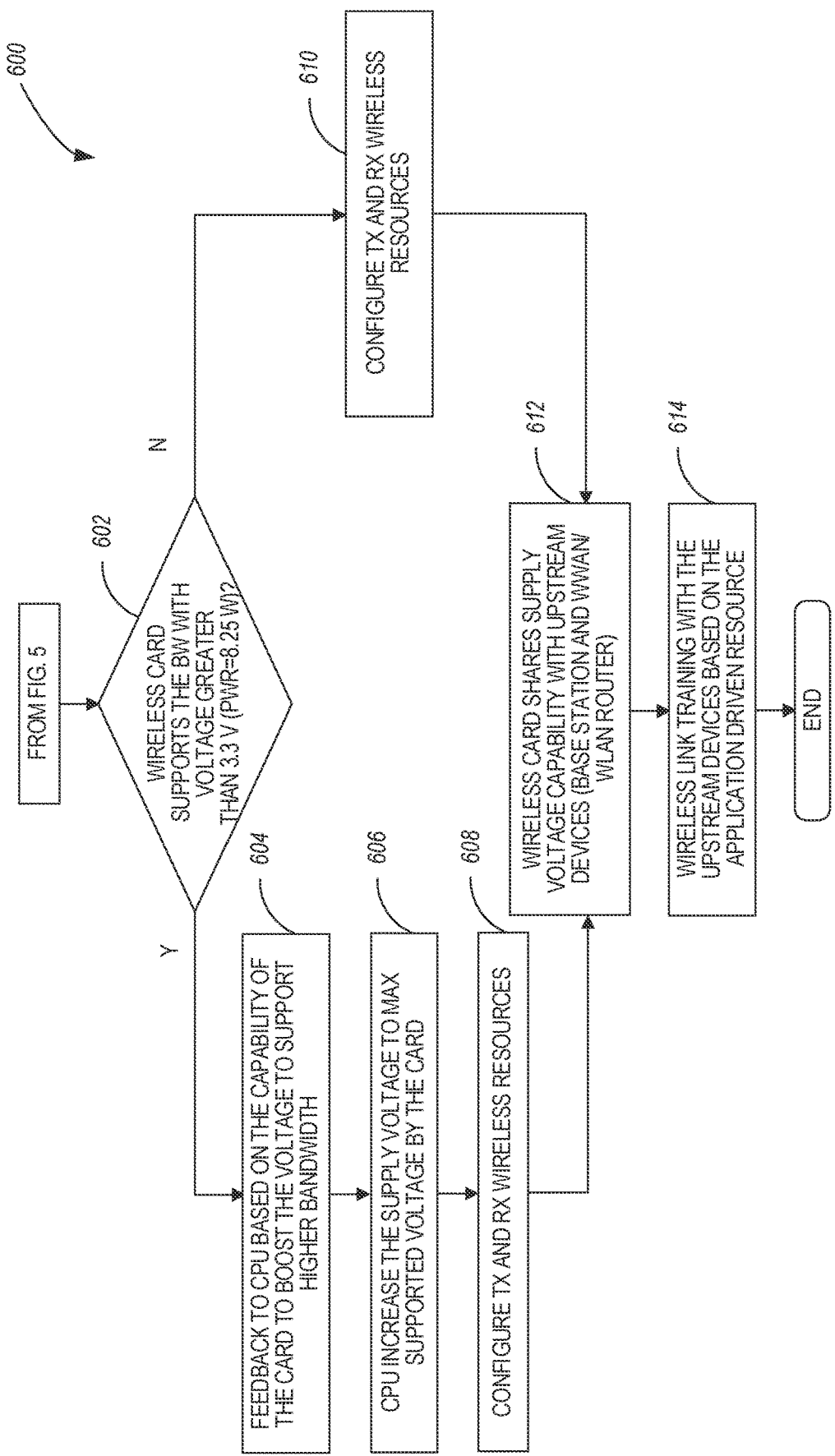

FIG. 5 and FIG. 6 illustrate flow diagrams 500 and 600 of a method for controlling power to a wireless device, in accordance with some embodiments.

In accordance with the disclosed techniques, a CPU (e.g., the application processor 111 or the sub-system processor 109) determines the application bandwidth (e.g., of an application executing on the application processor 111, and communicates the determined bandwidth to the WWAN WBPC. The WWAN WBPC, based on the application bandwidth requirement received from the CPU, will determine whether the bandwidth requirement is intensive or not. If the application needs intensive bandwidth (e.g., bandwidth greater than a pre-defined threshold) and needs more than 8.25 W, then the WWAN WBPC may request the CPU to boost the supply voltage of the voltage regulator to a maximum voltage (which the CPU has read/obtained during the initialization). The CPU may instruct the voltage regulator (e.g., through SVID or GPIO based VID control interface) to boost the voltage to the WWAN WBPC. The new voltage will be supplied to the WWAN WBPC, allowing the wireless circuit card to support the bandwidth requirements of the application.

Referring to FIG. 5, method 500 may be performed by a CPU (e.g., application processor 111 or sub-system processor 109) of a wireless device. At operation 502, the wireless device under test (DUT) (e.g., a wireless device including the wireless circuit card 102) is powered ON. At operation 504, the wireless circuit card 102 is powered (e.g., by voltage regulator 121) using a first input voltage (e.g., 3.3 V). At operation 506, the application processor 111 and the wireless circuit card 102 are initialized, and the application processor 111 detects the maximum voltage capability of the wireless circuit card 102 (e.g., by retrieving the voltage indicator 414 of the maximum voltage supported by the WBPC 400 from on-chip memory 412). At operation 508, an application is launched/executed on the application processor 111, which application uses wireless connectivity and bandwidth. At operation 510, the application processor 111 evaluates the application wireless bandwidth demand and computes the wireless bandwidth of the application for optimal application performance. At operation 512, the application processor 111 communicates the determined wireless bandwidth to the WWAN WBPC 400. Additional processing continues at FIG. 6.

Referring to FIG. 6, method 600 (which is a continuation of method 500) may be performed by the same CPU as in FIG. 5 (e.g., application processor 111 or sub-system processor 109) of the wireless device.

At operation 602, a determination is made on whether wireless circuit card 102 supports the wireless bandwidth with voltage greater than a first input voltage (e.g., 3.3 V) corresponding to a power of 8.25 W. If it is determined that the wireless circuit card 102 does not support the wireless bandwidth with voltage greater than the first input voltage, processing continues at operation 610 when transmit and receive resources of the wireless circuit card 102 are configured based on the first input voltage (i.e., supplied power by the voltage regulator 121 is not changed based on the application executing on application processor 111). Processing then continues at operation 612.

If it is determined that the wireless circuit card 102 supports the wireless bandwidth with voltage greater than the first input voltage, processing continues at operation 604 when the WBPC 400 (e.g., the sub-system processor 109) communicates a feedback signal to the application processor 111 based on the capability of the WBPC 400 (and the wireless circuit card 102) to boost the input voltage to support the wireless bandwidth. At operation 606, the application processor 111 increases the supply voltage generated by the voltage regulator 121 to a second input voltage (e.g., the maximum voltage supported by the WBPC as indicated by the voltage indicator 414). At operation 608, transmit and receive resources of the wireless circuit card 102 are configured based on the second input voltage.

At operation 612, the wireless circuit card 102 shares the updated supply voltage and the supply voltage capability with upstream devices (e.g., base stations or routers). At operation 614, wireless link training with the upstream devices takes place, based on the application-driven resources associated with the application executing on the wireless device.

Figure 7:
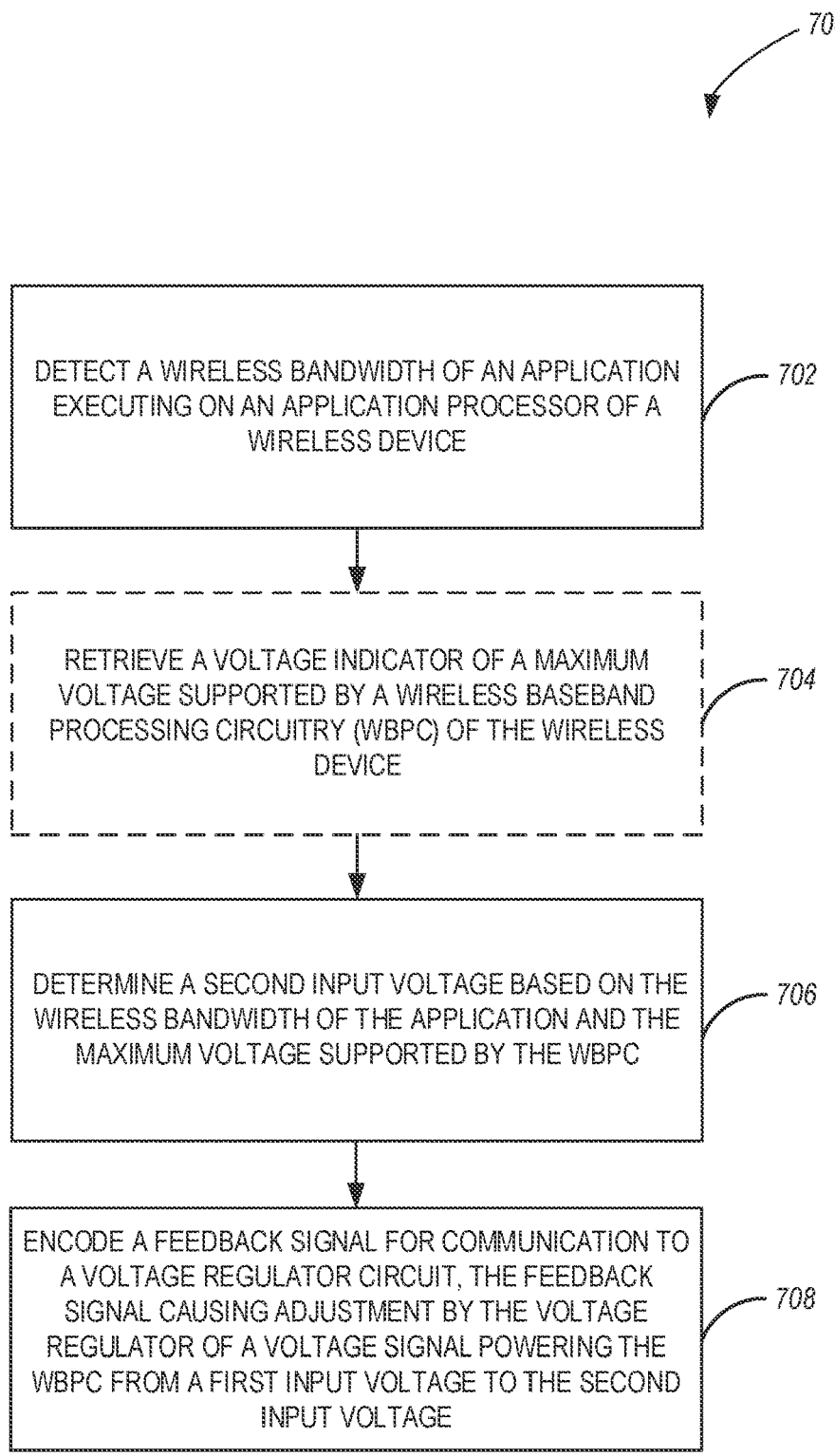
FIG. 7 illustrates a flow diagram of another method for controlling power to a wireless device, in accordance with some embodiments.

FIG. 7 illustrates a flow diagram of another method 700 for controlling power to a wireless device, in accordance with some embodiments. Referring to FIG. 7, method 700 includes operations 702, 704, 706, and 708, which may be executed by the application processor 111 or the sub-system processor 109.

At operation 702, a wireless bandwidth of an application executing on an application processor of a wireless device is detected. For example, the application processor 111 detects the wireless bandwidth of an application that it executes. At operation 704, a voltage indicator of a maximum voltage supported by a WBPC of the wireless device is retrieved. The WBPC is configured to process signals for transmission or reception using, e.g., a WWAN protocol standard. For example, the application processor 111 detects (e.g., using the on-chip memory 412 or the pin status of a pin in the interface 115 with the WBPC 400) the voltage indicator 414. In some embodiments, operation 704 may be optional (indicated with a dashed line in FIG. 7) as the maximum voltage supported by the WBPC 400 may be known in advance. In other aspects, where different maximum voltages are used for different processing scenarios (e.g., when different types of wireless signals associated with different signal protocols are processed), the voltage indicator of the maximum voltage may be stored and retrieved as provided in operation 704.

At operation 706, a second input voltage is determined based on the wireless bandwidth of the application and the maximum voltage supported by the WBPC. For example, the application processor 111 determines a second input voltage (e.g., 5 V) based on a maximum voltage supported by the WBPC (e.g., 5 V) and the wireless bandwidth of the application. Such determination is further based on verifying the maximum voltage supported by the WBPC results in a bandwidth that satisfies (e.g., it is equal or higher than) the wireless bandwidth of the application. At operation 708, a feedback signal is encoded for communication to a voltage regulator circuit (e.g., voltage regulator 121) powering the WBPC. The feedback signal causes adjustment of the voltage signal from a first input voltage to the second input voltage (e.g., adjustment to the maximum supported voltage such as 5 V or any other voltage above the first input voltage).

In some embodiments, the sub-system processor 109 decodes notification signaling from the application processor. The notification signaling includes the wireless bandwidth of the application. In some embodiments, the sub-system processor determines based on the notification signaling, a wireless bandwidth corresponding to the maximum voltage is equal to or higher than the wireless bandwidth of the application. In some embodiments, the feedback signal is encoded for communication to the voltage regulator circuit. The voltage regulator adjusts the voltage signal to the maximum voltage using the feedback signal. The feedback signal is based on determining the wireless bandwidth corresponding to the maximum voltage is equal to or higher than the wireless bandwidth.

In some embodiments, the voltage indicator of the maximum voltage is retrieved from the on-chip memory of the WBPC or is determined based on a status of a connection pin associated with a communication interface between the WBPC and the application processor.

In some embodiments, a notification signal of the second input voltage is encoded for transmission to a WWAN base station. The notification signal causes adjustment of communication bandwidth between the WWAN base station and the wireless device based on the second input voltage.

In some embodiments, the second input voltage is smaller than or equal to the maximum input voltage. Supplying the second input voltage to the WBPC causes adjustment of a communication bandwidth of the wireless device to satisfy the wireless bandwidth of the application.

Figure 8:
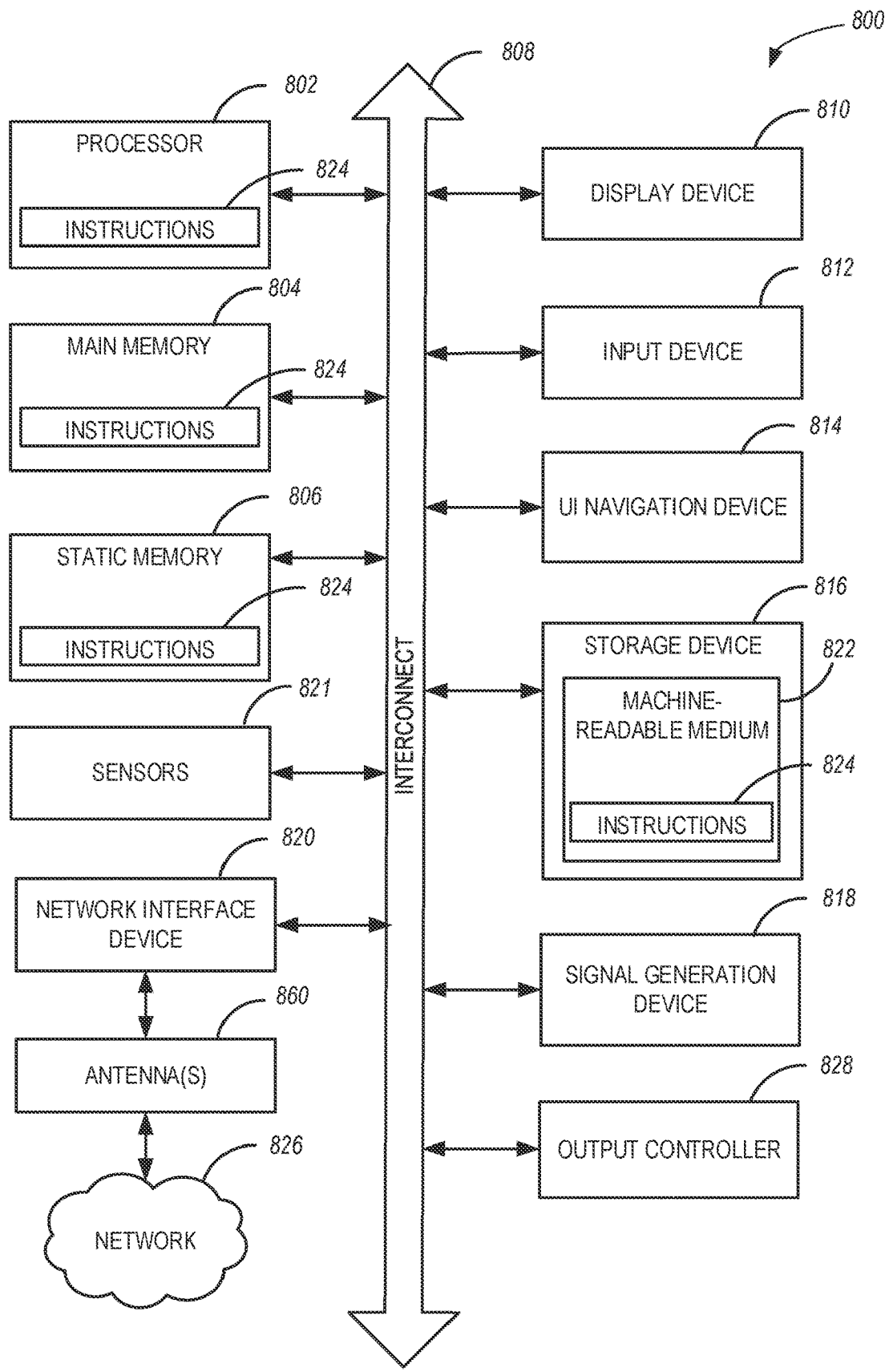
FIG. 8 illustrates a block diagram of an example machine upon which any one or more of the operations/techniques (e.g., methodologies) discussed herein may perform.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, machine 800 may operate in the capacity of a server machine, a client machine, or both in server-client network environments. In an example, the machine 800 may act as a peer machine in a peer-to-peer (P2P) (or other distributed) network environment. The machine 800 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 800 may include a hardware processor 802 (e.g., a central processing unit (CPU), a graphics processing unit (GPU), a hardware processor core, or any combination thereof), a main memory 804, and a static memory 806, some or all of which may communicate with each other via an interlink (e.g., bus) 808.

Specific examples of main memory 804 include Random Access Memory (RAM), and semiconductor memory devices, which may include, in some embodiments, storage locations in semiconductors such as registers. Specific examples of static memory 806 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 800 may further include a display device 810, an input device 812 (e.g., a keyboard), and a user interface (UI) navigation device 814 (e.g., a mouse). In an example, the display device 810, input device 812, and UI navigation device 814 may be a touch screen display. The machine 800 may additionally include a storage device (e.g., drive unit or another mass storage device) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 802 and/or instructions 824 may comprise processing circuitry and/or transceiver circuitry.

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

Specific examples of machine-readable media may include non-volatile memory, such as semiconductor memory devices (e.g., EPROM or (EPROM) and flash memory devices; magnetic disks, such as internal hard disks and removable disks; magneto-optical disks; RAM; and CD-ROM and DVD-ROM disks.

While the machine-readable medium 822 is illustrated as a single medium, the term "machine-readable medium" may include a single medium or multiple media (e.g., a centralized or distributed database, and/or associated caches and servers) configured to store one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, one or more sensors 821, a network interface device 820, antennas 860, a display device 810, an input device 812, a UI navigation device 814, a storage device 816, instructions 824, a signal generation device 818, and an output controller 828. The apparatus may be configured to perform one or more of the methods and/or operations disclosed herein. The apparatus may be intended as a component of the machine 800 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding, or carrying instructions for execution by the machine 800, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

ADDITIONAL NOTES AND EXAMPLES

Example 1 is a wireless device comprising: a voltage regulator circuit configured to generate a voltage signal of a first input voltage; and a wireless baseband processing circuitry (WBPC) coupled to the voltage regulator circuit to receive the voltage signal, the WBPC configured to process signals for transmission or reception using wireless technology, and the WBPC comprising a sub-system processor circuit configured to detect a wireless bandwidth of an application executing on an application processor of the wireless device; determine a second input voltage based on the wireless bandwidth of the application and a maximum voltage supported by the WBPC; and encode a feedback signal for communication to the voltage regulator circuit, wherein based on the feedback signal, the voltage regulator is configured to adjust the voltage signal to the second input voltage.

In Example 2, the subject matter of Example 1 includes subject matter where the wireless technology is based on a Wireless Wide Area Network (WWAN) protocol standard and the WBPC is WWAN baseband processing circuitry.

In Example 3, the subject matter of Example 2 includes subject matter where the sub-system processor circuit is configured to decode notification signaling from the application processor, the notification signaling including the wireless bandwidth of the application.

In Example 4, the subject matter of Example 3 includes subject matter where the sub-system processor circuit is configured to determine based on the notification signaling, a wireless bandwidth corresponding to the maximum voltage is equal to or higher than the wireless bandwidth of the application.

In Example 5, the subject matter of Example 4 includes subject matter where the sub-system processor circuit is configured to encode the feedback signal for communication to the voltage regulator circuit, the feedback signal causing adjustment of the voltage signal to the maximum voltage, the feedback signal based on determining the wireless bandwidth corresponding to the maximum voltage is equal to or higher than the wireless bandwidth.

In Example 6, the subject matter of Examples 2-5 includes subject matter where the sub-system processor circuit is configured to retrieve a voltage indicator of the maximum voltage from on-chip memory of the WBPC.

In Example 7, the subject matter of Examples 2-6 includes subject matter where the first input voltage is approximately about 3.3 V and the second input voltage is approximately about 5 V (or any other voltage that is above 3.3 V).

In Example 8, the subject matter of Examples 2-7 includes subject matter where the sub-system processor circuit is configured to encode a notification signal of the second input voltage for transmission to a WWAN base station, the notification signal causing adjustment of communication bandwidth between the WWAN base station and the wireless device based on the second input voltage.

In Example 9, the subject matter of Examples 1-8 includes subject matter where the second input voltage is smaller than or equal to the maximum input voltage, and wherein supplying the second input voltage to the WBPC causes adjustment of a communication bandwidth of the wireless device to satisfy the wireless bandwidth of the application.

Example 10 is a wireless device comprising: a voltage regulator circuit configured to generate a voltage signal of a first input voltage; and a wireless baseband processing circuitry (WBPC) coupled to the voltage regulator circuit to receive the voltage signal, the WBPC configured to process signals for transmission or reception using wireless technology; and an application processor, the application processor coupled to the voltage regulator and the WBPC, the application processor configured to detect a wireless bandwidth of an application executing on the application processor; determine a second input voltage based on the wireless bandwidth of the application and a maximum voltage supported by the WBPC; and encode a feedback signal for communication to the voltage regulator circuit, wherein based on the feedback signal, the voltage regulator is configured to adjust the voltage signal to the second input voltage.

In Example 11, the subject matter of Example 10 includes subject matter where the wireless technology is based on a Wireless Local Area Network (WLAN) protocol standard and the WBPC is WLAN baseband processing circuitry.

In Example 12, the subject matter of Example 11 includes subject matter where the application processor is configured to retrieve a voltage indicator of the maximum voltage supported by the WBPC from on-chip memory of the WBPC.

In Example 13, the subject matter of Examples 11-12 includes subject matter where the application processor is configured to detect a voltage indicator of the maximum voltage supported by the WBPC based on a status of a connection pin associated with a communication interface between the WBPC and the application processor.

Example 14 is a method for controlling power to a wireless device, the method comprising: detecting a wireless bandwidth of an application executing on an application processor of the wireless device; retrieving a voltage indicator of a maximum voltage supported by a wireless baseband processing circuitry (WBPC) of the wireless device, the WBPC configured to process signals for transmission or reception using a Wireless Wide Area Network (WWAN) protocol standard; determining a second input voltage based on the wireless bandwidth of the application and the maximum voltage supported by the WBPC; and encoding a feedback signal for communication to a voltage regulator circuit, the feedback signal causing adjustment of the voltage signal to the second input voltage.

In Example 15, the subject matter of Example 14 includes, decoding notification signaling from the application processor, the notification signaling including the wireless bandwidth of the application.

In Example 16, the subject matter of Example 15 includes, determining based on the notification signaling, a wireless bandwidth corresponding to the maximum voltage is equal to or higher than the wireless bandwidth of the application.

In Example 17, the subject matter of Example 16 includes, encoding the feedback signal for communication to the voltage regulator circuit; adjusting the voltage signal to the maximum voltage using the feedback signal, the feedback signal based on determining the wireless bandwidth corresponding to the maximum voltage is equal to or higher than the wireless bandwidth.

In Example 18, the subject matter of Examples 14-17 includes, retrieving the voltage indicator of the maximum voltage from on-chip memory of the WBPC or based on a status of a connection pin associated with a communication interface between the WBPC and the application processor.

In Example 19, the subject matter of Examples 14-18 includes, encoding a notification signal of the second input voltage for transmission to a WWAN base station, the notification signal causing adjustment of communication bandwidth between the WWAN base station and the wireless device based on the second input voltage.

In Example 20, the subject matter of Examples 14-19 includes subject matter where the second input voltage is smaller than or equal to the maximum input voltage, and wherein supplying the second input voltage to the WBPC causes adjustment of a communication bandwidth of the wireless device to satisfy the wireless bandwidth of the application.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. A wireless device comprising:
    a voltage regulator circuit configured to generate a voltage signal of a first input voltage; and
    a wireless baseband processing circuitry (WBPC) coupled to the voltage regulator circuit to receive the voltage signal, the WBPC configured to process signals for transmission or reception using wireless technology, and the WBPC comprising a sub-system processor circuit configured to:
        decode first notification signaling as signaling received from an application processor of the wireless device;
        detect a wireless bandwidth of an application executing on the application processor based on the first notification signaling including the wireless bandwidth of the application;
        determine a second input voltage based on the wireless bandwidth of the application and a maximum voltage supported by the WBPC; and
        encode a feedback signal for communication to the voltage regulator circuit,
        wherein based on the feedback signal, the voltage regulator is configured to adjust the voltage signal to the second input voltage, and wherein the wireless technology is based on a Wireless Wide Area Network (WWAN) protocol standard and the WBPC is WWAN baseband processing circuitry.

2. The wireless device of claim 1, wherein the sub-system processor circuit is configured to:
    determine based on the first notification signaling, a wireless bandwidth corresponding to the maximum voltage is equal to or higher than the wireless bandwidth of the application.

3. The wireless device of claim 2, wherein the sub-system processor circuit is configured to:
    encode the feedback signal for communication to the voltage regulator circuit, the feedback signal causing adjustment of the voltage signal to the maximum voltage, the feedback signal based on determining the wireless bandwidth corresponding to the maximum voltage is equal to or higher than the wireless bandwidth.

4. The wireless device of claim 1, wherein the sub-system processor circuit is configured to:
    retrieve a voltage indicator of the maximum voltage from on-chip memory of the WBPC.

5. The wireless device of claim 1, wherein the first input voltage is approximately about 3.3 V and the second input voltage is approximately about 5 V.

6. The wireless device of claim 1, wherein the sub-system processor circuit is configured to:
    encode second notification signaling of the second input voltage for transmission to a WWAN base station, the second notification signaling causing adjustment of communication bandwidth between the WWAN base station and the wireless device based on the second input voltage.

7. The wireless device of claim 1, wherein the second input voltage is smaller than or equal to the maximum input voltage, and wherein supplying the second input voltage to the WBPC causes adjustment of a communication bandwidth of the wireless device to satisfy the wireless bandwidth of the application.

8. A wireless device comprising:
    a voltage regulator circuit configured to generate a voltage signal of a first input voltage; and
    a wireless baseband processing circuitry (WBPC) coupled to the voltage regulator circuit to receive the voltage signal, the WBPC configured to process signals for transmission or reception using wireless technology; and
    an application processor, the application processor coupled to the voltage regulator and the WBPC, the application processor configured to:
        decode first notification signaling as signaling received from an application processor of the wireless device;
        detect a wireless bandwidth of an application executing on the application processor based on the first notification signaling including the wireless bandwidth of the application;
        determine a second input voltage based on the wireless bandwidth of the application and a maximum voltage supported by the WBPC; and
        encode a feedback signal for communication to the voltage regulator circuit,
        wherein based on the feedback signal, the voltage regulator is configured to adjust the voltage signal to the second input voltage, and wherein the wireless technology is based on a Wireless Wide Area Network (WWAN) protocol standard and the WBPC is WWAN baseband processing circuitry.

9. The wireless device of claim 8, wherein the application processor is configured to:

retrieve a voltage indicator of the maximum voltage supported by the WBPC from on-chip memory of the WBPC.

10. The wireless device of claim 8, wherein the application processor is configured to:

detect a voltage indicator of the maximum voltage supported by the WBPC based on a status of a connection pin associated with a communication interface between the WBPC and the application processor.

11. A method for controlling power to a wireless device, the method comprising:

decoding first notification signaling as signaling received from an application processor of the wireless device;

detecting a wireless bandwidth of an application executing on the application processor based on the first notification signaling including the wireless bandwidth of the application;

retrieving a voltage indicator of a maximum voltage supported by a wireless baseband processing circuitry (WBPC) of the wireless device, the WBPC configured to process signals for transmission or reception using a Wireless Wide Area Network (WWAN) protocol standard;

determining a second input voltage based on the wireless bandwidth of the application and the maximum voltage supported by the WBPC; and encoding a feedback signal for communication to a voltage regulator circuit, the feedback signal causing adjustment of a voltage signal generated by the voltage regulator circuit to the second input voltage.

12. The method of claim 11, further comprising:

determining based on the first notification signaling, a wireless bandwidth corresponding to the maximum voltage is equal to or higher than the wireless bandwidth of the application.

13. The method of claim 12, further comprising:

encoding the feedback signal for communication to the voltage regulator circuit;

adjusting the voltage signal to the maximum voltage using the feedback signal, the feedback signal based on determining the wireless bandwidth corresponding to the maximum voltage is equal to or higher than the wireless bandwidth.

14. The method of claim 11, further comprising:

retrieving the voltage indicator of the maximum voltage from on-chip memory of the WBPC or based on a status of a connection pin associated with a communication interface between the WBPC and the application processor.

15. The method of claim 11, further comprising:

encoding second notification signaling of the second input voltage for transmission to a WWAN base station, the second notification signaling causing adjustment of communication bandwidth between the WWAN base station and the wireless device based on the second input voltage.

16. The method of claim 11, wherein the second input voltage is smaller than or equal to the maximum input voltage, and wherein supplying the second input voltage to the WBPC causes adjustment of a communication bandwidth of the wireless device to satisfy the wireless bandwidth of the application.

* * * * *